Aug. 5, 1958
D. L. CLARK
Re. 24,512
ERASING HEAD FOR MAGNETIC RECORDING
Original Filed Feb. 23, 1945
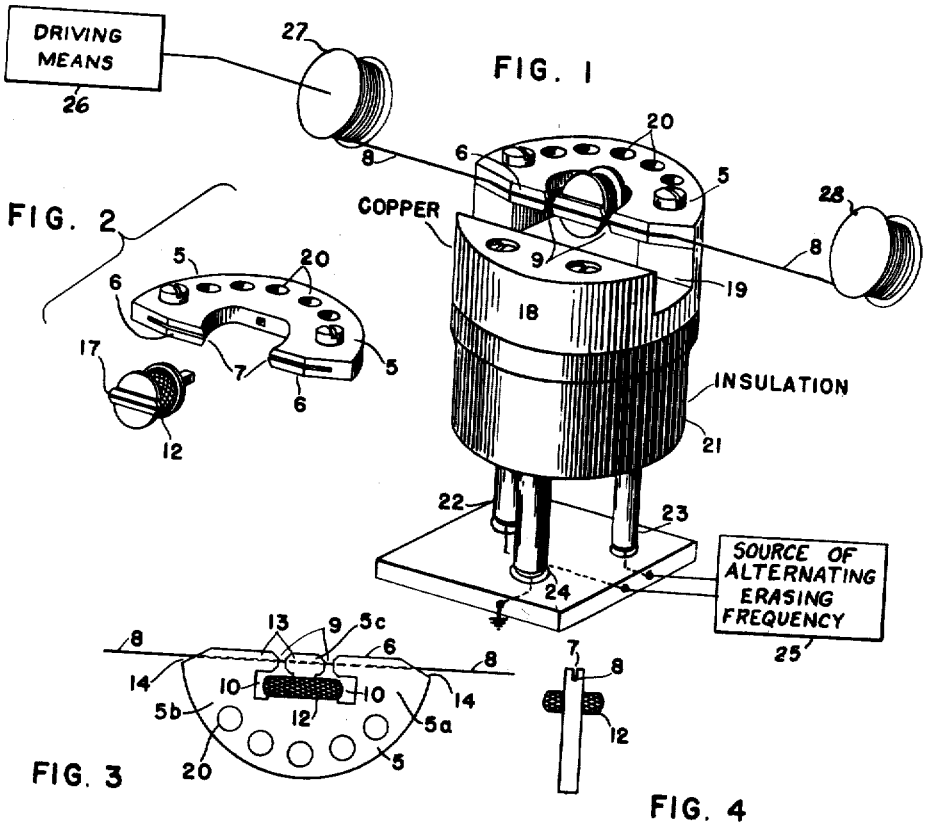
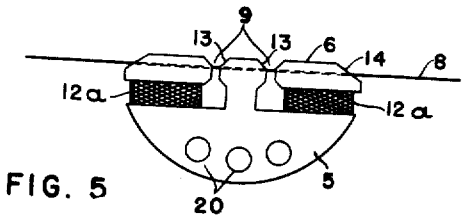
INVENTOR.
DONALD L. CLARK
BY J. L. Bowen
ATTORNEY United States Patent Office Re. 24,512
Reissued Aug. 5, 1958

24,512

ERASING HEAD FOR MAGNETIC RECORDING

Donald L. Clark, Rochester, N. Y., assignor, by mesne assignments, to General Dynamics Corporation, a corporation of Delaware Original No. 2,655,562, dated October 13, 1953, Serial No. 579,393, February 23, 1945. Application for reissue December 16, 1957, Serial No. 704,856

7 Claims. (Cl. 179—100.2)

Matter enclosed in heavy brackets [ ] appears in the original patent but forms no part of this reissue specification; matter printed in italics indicates the additions made by reissue.

This invention relates to an erasing head for a magnetic sound recording system.

When a record of a sound signal is made in a magnetic recording medium, the record consists of a configuration of the magnetic field about the medium which has a definite relation to the original signal. It is desirable to be able to remove or erase this configuration at will so that the medium can be used again for making other recordings.

The way in which this is usually done is to pass the medium continuously through an "erasing head" just before making a new record. In the erasing head, the medium is subjected to an intense alternating magnetic field. In order to erase the record completely this field must be intense enough to saturate the medium and must alternate fast enough so that each element of the medium is saturated at least once in both a positive and negative direction while passing through the field. After being saturated, each element should be subjected to several alternations in which the intensity decreases gradually to zero, leaving it demagnetized. This is an adaptation of the well known fundamental method of demagnetizing a ferromagnetic medium.

The erasing head may be one of several types. One type is a solenoid through the center of which the medium passes. Other types of erasing heads consist of a coil and a ferromagnetic structure of some sort provided with a short gap through which the medium passes. The use of a ferromagnetic core makes it possible to produce a more intense field than can be obtained with a solenoid, assuming the same magnetomotive force.

In order to meet the requirements set forth above for demagnetizing the recording medium as it passes continuously through an erasing head, it is usually necessary to use a supersonic frequency for energizing an erasing head of practical size. This leads to difficulties in producing a sufficiently intense magnetic field for complete erasing because the losses in a ferromagnetic core are large at these frequencies and may produce excessive heating. The required current in a solenoid may also be large enough to produce excessive heating. These difficulties are not serious with some recording media. However, for practical high grade recordings, it is necessary to use a recording medium having as high a coercive force as is consistent with other requirements. Such materials are, of course, very difficult to demagnetize, and the common types of erasing heads either fail to erase the record completely or become too hot when enough current is used to erase completely.

In accordance with the main feature of the invention there is provided an erasing head of simple construction which will effectively damagnetize even the most difficult materials.

Other features and advantages of the invention will appear from the detailed description and claims when taken with the drawings in which:

Fig. 1 is a perspective view of the erasing head of the present invention made in the form of a unit or so-called cartridge that can be readily plugged into the circuits of a magnetic recorder;

Fig. 2 is an exploded perspective view of one form of the main part of the erasing head;

Figs. 3 and 4 are respectively a front view and an end view of the core and the energizing coil therefor comprising the erasing head together with a magnetic record passing through the slot in the core; and Fig. 5 illustrates a modified form of the invention in which an energizing coil is provided for each of the several gaps in the core.

One form of the invention comprises a core 5 of ferromagnetic material preferably having at least one straight edge 6. As herein shown, the core is generally semicircular in shape, although the invention is not limited to this shape. The straight edge of the core is provided with a slot 7 extending along this edge, the slot being of such width that it will conveniently receive a suitable recording medium 8 such as a wire or strip of ferromagnetic material from which the sound record is to be removed. *Core 5 in the illustrated embodiments is provided with co-planar legs 5a, 5b and 5c terminating in pole pieces defining gaps 9, the pole piece portions of the core being disposed in end-to-end relationship. This arrangement provides a plurality of magnetic paths in parallel, the intermediate leg 5c being common to the two magnetic paths energizing gaps 9.* In accordance with this invention, the mentioned straight edge of the core is provided with at least two transverse gaps 9 located rather close together and opening into enlarged recesses 10 in the core wherein a coil 12 is mounted *on leg 5c.* Any suitable means may be employed for moving the recording medium 8 successively across gaps 9 and through the erasing fields existing at those gaps. There is illustrated in the drawing in a general manner spools or pulleys 26 and 27 which may have suitable take-up devices and supporting means (not shown) as may be necessary. One of the spools, for example, spool or pulley 27 is associated with suitable driving means such as a suitable motor for example, the driving means being indicated by the numeral 26. By this means, the erasing fields act successively on each element of the recording medium as it passes through each gap in order to erase any signal therefrom. The portions of the core at each side of each gap are shaped to provide tapered pole pieces 13 directed toward each other. Such tapered pole pieces have the slot 7 extending centrally thereof and thereby serve to intensify the erasing field through which the wire or strip record passes. The tapering of the pole pieces adjacent the slots 9 also causes the intensity of the erasing field across each gap to decrease relatively gradually to a minimum value. It will be noted that each end of the straight edge of the core is inclined, as indicated at 14, at an angle to the direction of motion of the wire or strip 8 constituting the recording medium so that a joint in this medium will be guided over the edge 6 of the head rather than the slot 7, if the joint is too large to travel through the slot 7. The core can be made of a single piece of sheet material, as illustrated in Figs. 3, 4 and 5 in which case the coil will have to be wound by hand within the core. However, as indicated in Fig. 2, the core includes an insert 17 to which the coil 12 may be applied. The insert 17, with the coil 12 mounted thereon, can be secured, as by welding or otherwise, to the main body of the core.

The coil 12 is usually energized during the erasing operation by current alternating at supersonic frequencies furnished from a suitable source of alternating erasing current as indicated by the numeral 25. Provision, therefore, has been made for dissipating the resulting heat developed in the erasing head during the erasing operation, by mounting the core 5 and coil 12 of the head proper, on a generally cylindrical, solid block 18 of copper having a recess 19 milled out for the reception of the coil. The copper block increases the heat radiating area of the head and aids in keeping the temperature of the head proper within reasonable limits. Holes 20 may also be provided in the core to aid further in the dissipation of heat. The portion of the head thus far described may have the lower end of the block 18 secured in a suitable insulating base or plug 21 provided with pin terminals 22, 23 and 24. Two of these terminals 22 and 23, which are conductively connected through an opening or openings (not shown) in the block to the ends of the coil 12, may be plugged into a suitable source of current (not shown) alternating at supersonic frequencies. The third terminal 24 may be connected to a suitable ground potential (not shown). The erasing head proper together with its copper block radiator and pin terminals, constitutes a small cartridge or unit that can be readily plugged into a socket connected into the circuits of the recorder. Due to the small size of the unit, provision is easily made to confine the magnetic field thereof to a small volume. Thus, the entire erasing head can be shielded so that it will have little effect on nearby circuits. While the core is herein illustrated as made of solid sheet metal, it can be formed of laminations, but the use of laminations increases the labor necessary in assembling the core.

In the foregoing arrangements, a single coil 12 energizes both gaps 9, but in the arrangement of Fig. 5, an energizing coil 12a is provided for each gap 9. However, in all of these arrangements the portion of the core between the two gaps 9 is common to the two ferromagnetic circuits respectively including the two outside pole pieces 13 of the core.

While the invention is not limited to the size of the erasing head unit, the following dimensions will be helpful in visualizing how small such a unit can be made and yet effectively perform its intended functions. The area of the core 5 may be generally that of a semicircle having a diameter of five-eighths of an inch, while the thickness of the core may be one-sixteenth of an inch. The gaps 9 may each have a width of twelve thousandths of an inch, whereas the slot 7 will freely receive a wire record four thousandths of an inch in diameter. The distance between said gaps may be three-sixteenths of an inch.

I claim:

[1. Magnetic apparatus comprising a core of magnetic material having a slot extending across a surface thereof, said core having a plurality of gaps adjacent each other in said surface extending across said slot, means for developing across each of said gaps by interconnected ferromagnetic circuits in said core an alternating magnetic erasing field, a ferromagnetic medium, and means for moving said medium through said slot and successively across said gaps whereby any signal magnetically recorded on said medium previously is erased.]

[2. Magnetic apparatus comprising a core of magnetic material having a slot extending across a surface thereof, said core having a plurality of closely spaced gaps in said surface extending transversely thereof through said slot, a coil for alternating erasing current encircling a portion of the core for developing an erasing field across each of said gaps, a ferromagnetic medium, and means for moving said medium through said slot and successively across said gaps whereby any signal magnetically recorded on said medium previously is erased.]

3. Magnetic apparatus comprising a core of magnetic material [having a slot extending therealong], said core having a pair of gaps adjacent each other and extending [transversely] *across a surface* thereof [through said slot], means including a coil individual to each gap for developing across each of said gaps, an alternating magnetic erasing field, a ferromagnetic medium, and means for moving said medium through said slot and successively across said gaps whereby any signal magnetically recorded thereon previously is erased.

4. In magnetic apparatus comprising an erasing head for erasing a record from a ferromagnetic medium having a signal magnetically recorded thereon including a core of magnetic material having *pole piece portions defining a plurality of gaps, the adjacent gap-forming pole piece portions being disposed in end-to-end relationship,* [a plurality of gaps across a surface thereof,] and means utilizing interconnected magnetic circuits in said core for developing across each gap an alternating magnetic erasing field, and means for guiding said medium through said fields in succession whereby said erasing fields act successively on each element of said medium to remove said signal therefrom.

5. In magnetic apparatus comprising an erasing head for erasing a record from a ferromagnetic medium having a signal magnetically recorded thereon including a core of magnetic material *having pole piece portions defining a plurality of gaps, the adjacent gap-forming pole piece portions being disposed in end-to-end relationship,* [a plurality of gaps across a surface of said core], and means utilizing interconnected magnetic circuits in said core *portion* for developing [an] alternating erasing field across each of said gaps, and means for guiding said medium through said fields in succession whereby said erasing fields act successively on each element of said medium to remove said signal therefrom, the intensity of the erasing field across at least the last of said gaps being decreased relatively gradually to a minimum value.

6. In magnetic apparatus comprising an erasing head for erasing a previously magnetically recorded signal from a ferromagnetic medium including a core *portion* of magnetic material [disposed] to provide magnetic paths in parallel, a portion of said core being common to each magnetic path, [and each path having a gap extending transversely of the path of said medium,] *the core portions defining the gaps being disposed in end-to-end relationship,* means for guiding said medium successively across said gaps, and a coil for alternating erasing current encircling said common core portion to establish an erasing field at each of said gaps, whereby said medium passes successively through the [two] erasing fields.

7. In an erasing head for erasing a record from a ferromagnetic medium having a signal magnetically recorded thereon, a core of magnetic material [having] a plurality of gaps [across a surface thereof], *the core portions defining the gaps being disposed in end-to-end relationship,* and means utilizing interconnected magnetic circuits in said core for developing across each gap an alternating magnetic erasing field whereby said erasing fields may act successively on each element of a medium moved through said fields in order to remove said signal therefrom.

*8. In magnetic apparatus comprising an erasing head for erasing a previously magnetically recorded signal from a ferromagnetic medium including a core of magnetic material having three legs disposed to provide a pair of gaps across the surface thereof and also a pair of magnetic paths in parallel, one of said legs being common to each magnetic path, means for guiding said medium successively across said gaps and a coil for alternating erasing current encircling said common leg to establish a field at each of said gaps whereby said medium passes successively through two erasing fields.*

*9. In magnetic apparatus comprising an erasing head for erasing a previously magnetically recorded signal from a ferromagnetic medium including a core of magnetic material having at least three legs lying substantially in a common plane to provide a plurality of mag-*

*netic paths in parallel, each of the legs intermediate the outer legs being common to a pair of said magnetic paths, each path having a gap extending transversely of the path of said medium, said gaps lying in a plane transverse to said common plane, means for guiding said medium successively across said gaps, and means for establishing an erasing field at each of said gaps whereby said medium passes successively through a plurality of erasing fields.*

References Cited in the file of this patent or the original patent

UNITED STATES PATENTS

| | | |
|---|---|---|
| 1,459,202 | Fuller | June 19, 1923 |
| 1,858,553 | Liguori | May 17, 1932 |
| 2,351,007 | Camras | June 13, 1944 |
| 2,784,259 | Camras | Mar. 5, 1957 |

FOREIGN PATENTS

| | | |
|---|---|---|
| 779,642 | France | Apr. 10, 1935 |
| 805,434 | France | Nov. 19, 1936 |

UNITED STATES PATENT OFFICE

CERTIFICATE OF CORRECTION

Reissue No. 24,512 August 5, 1958

Donald L. Clark

It is hereby certified that error appears in the printed specification of the above numbered patent requiring correction and that the said Letters Patent should read as corrected below.

Column 4, lines 27 and 37, strike out "portion", in italics, in each occurrence.

Signed and sealed this 24th day of March 1959.

(SEAL)

Attest:

KARL H. AXLINE

Attesting Officer

ROBERT C. WATSON

Commissioner of Patents